United States Patent Office 3,513,141
Patented May 19, 1970

3,513,141
PROCESS FOR IMPROVING OZONE RESISTANCE OF HYDROGENATED RUBBER
Roy F. Wright and William T. Cooper, Bartlesville, Okla., assignors to Phillips Petroleum Company, a corporation of Delaware
No Drawing. Filed Aug. 8, 1967, Ser. No. 659,010
Int. Cl. C08f 27/22, 27/25; C08c 5/00
U.S. Cl. 260—85.1                     3 Claims

ABSTRACT OF THE DISCLOSURE

The ozone resistance of hydrogenated rubbery polymers containing residual unsaturation is improved by aging the polymers in an oxygen-containing atmosphere at a temperature of 200° to 350° F.

BACKGROUND

Natural rubber and rubbery polymers formed by the polymerization and copolymerization of diene monomers are known to have relatively poor ozone resistance. Since resistance to degradation by ozone is of considerable importance in a number of applications of rubber, such as fabrication into tires, the improvement of the ozone resistance of these rubbers is of considerable importance.

It is believed that the low resistance to ozone degradation of these rubbers is due to unsaturation which remains in molecules, and which provides a point of attack for the ozone. It has therefore been proposed that the ozone resistance of such unsaturated rubber can be improved by hydrogenating the rubber. While such hydrogenation does yield an improvement in ozone resistance, even the hydrogenated rubbers do not have as much ozone resistance as competitive materials, such as ethylene-propylene copolymers, ethylene-propylene-diene terpolymers, and butyl rubber.

It is therefore an object of this invention to improve the ozone resistance of hydrogenated rubbers.

SUMMARY

In accordance with our invention, the ozone resistance of hydrogenated rubbers is improved by heat aging these rubbers at a temperature of 200° F. to about 350° F. The invention is most useful when applied to hydrogenated rubbers obtained by conventional rubber hydrogenation techniques that have an iodine chloride titration value of 0.1 to 2 millimols per gram of rubber.

DESCRIPTION OF THE PREFERRED EMBODIMENTS

The rubbery polymers to which the process of our invention can be applied include natural rubber and those rubbery materials formed by the polymerization of conjugated diene monomers such as butadiene, isoprene, and the like, or by copolymerization of diene monomers and vinyl monomers such as styrene. The polymers can be prepared in mass, emulsion, or solution systems. Emulsion polymers are described in Synthetic Rubber by Whitby (John Wiley & Sons, 1954). Other polymers to which the process of the invention are applicable are described, for example, in U.S. Pats. 2,975,160, 3,047,559, 3,170,903, 3,178,402, 3,251,905, 3,280,084, 3,280,094, 3,281,383, 3,287,333, and others. These polymers include, for example, butadiene-styrene random copolymer, butadiene-styrene block copolymer, polybutadiene, polyisoprene, and the like. Such rubbers prior to hydrogenation can have a substantial degree of unsaturation. In the case of butadiene-styrene random copolymer, for example, the iodine chloride titration value can be up to 15 millimols per gram of rubber, or even more.

These unsaturated rubbers can be hydrogenated by processes known to the art, such as by the use of supported nickel catalysts as described in U.S. Pat. 2,864,809, or organo metal catalysts as described in U.S. Pats. 3,113,986 and 3,205,278. Such hydrogenation techniques, when conducted on a commercial scale, will reduce the degree of unsaturation of the rubbers as determined by iodine chloride titration to any desired level, such as 0.1 to 2 millimols of iodine chloride per gram of polymer.

The procedure used to determine total unsaturation by iodine chloride titration was as follows: A 0.5 gram sample of polymer was dissolved in a 75/25 volume mixture of carbon disulfide and chloroform, a chloroform solution of iodine chloride of known concentration (approximately 0.09–0.10 molar) was added, the mixture was placed in a 25° C. bath for one hour to allow time for reaction, and the excess of iodine chloride was titrated with 0.05 N sodium thiosulfate. The millimoles of iodine chloride that reacted with one gram of sample was then calculated. A blank was run using only solvent and iodine chloride and appropriate correction was made when calculating unsaturation.

The heat aging process of our invention is accomplished by heating the hydrogenated polymers in oxygen, air or an oxygen-containing gas such as a flue gas obtained by burning hydrocarbons in an excess of air at a temperature of about 200° to about 350° F. The length of time of such heating will vary depending upon the degree of unsaturation of the polymer; such heating can require a period of time from about 1 hour to as much as about 10 days.

The hydrogenated polymers of the invention can be compounded in any manner known to the industry and in any of the compounding recipes known to the industry. Curing can be effected in any manner known to the industry, such as by heating for 10 to 60 minutes at temperatures in the range of 250 to 450° F. Any of the known antioxidants, pigments, curing agents, accelerators, blowing agents, and the like, known to the industry, can be used.

Rubbery polymers or compounded polymers treated according to the process of our invention have a very high degree of resistance to ozone, and are, therefore, suitable for rubber compositions for use in high ozone atmospheres. In particular, such compositions are suitable for use in the formation of tires, even for use in large cities where the ozone concentration of the air is quite high. They can also be used in rubber sponge, microcellular shoe soles, and other applications requiring ozone resistance.

EXAMPLE I

Three samples of butadiene-styrene copolymer were made according to the following polymerization recipe:

POLYMERIZATION RECIPE

|  | Parts by Weight Polymer | | |
|---|---|---|---|
|  | A | B | C |
| Cyclohexane | 800 | 800 | 800 |
| Butadiene | 75 | 75 | 75 |
| Styrene | 25 | 25 | 25 |
| Divinylbenzene | 0.06 | 0.06 | 0.06 |
| Tetrahydrofuran | 1.5 | 1.5 | 1.5 |
| n-Butyllithium | 0.115 | 0.125 | 0.122 |
| Temperature, avg., ° F | 225 | 292 | 280 |

The three unterminated polymers formed above were hydrogenated at about 300° F. and 200–210 p.s.i.g. hydrogen pressure using a catalyst consisting of nickel stearate and triisobutylaluminum. Following hydrogenation, polymer A had an iodine chloride titration value of 1.8 millimols per gram; polymer B had a titration value of 1.5 millimols per gram; and polymer C had a titration value of 0.7 millimol per gram.

The three polymers were compounded according to the following recipe:

|  | Parts by weight |
|---|---|
| Polymer | 100 |
| Carbon black N-330 [a] | 50 |
| Zinc oxide | 5 |
| Stearic acid | 1 |
| Agerite alba [b] | 1 |
| Circo light oil [c] | 10 |
| Sulfur | 1.5 |
| Captax [d] | 0.5 |
| Monex [e] | 1.5 |

[a] A high abrasion furnace black.
[b] Hydroquinone monobenzyl ether.
[c] Naphthenic type oil.
[d] 2-mercaptobenzothiazole.
[e] Tetramethylthiuram monosulfide.

The compounded samples were tested for ozone resistance by exposing them to circulating air containing 25 to 30 parts by weight of ozone per 100 million parts of air at a temperature of 100° F. The samples were examined after 8, 13, and 27 days exposure to the ozone-containing air, and rated on a scale of 0 to 10, with 0 meaning no cracks and 10 meaning many large cracks. Samples of each polymer were also tested after aging at 250° F. for four hours, 24 hours, and 48 hours according to the process of this invention. The results are tabulated below:

OZONE TEST RATING

|  | Days in Test | | |
|---|---|---|---|
|  | 8 | 13 | 27 |
| Original Samples (Cured 20 min. at 320° F.): | | | |
| Sample A [1] | 4 | 5 | 8 |
| Sample B [2] | 2 | 3 | 6 |
| Sample C [3] | 0 | 1 | 4 |
| Aged 4 hours at 250° F.: | | | |
| Sample A | 5 | 6 | 9 |
| Sample B | 0 | 0 | 0 |
| Sample C | 0 | 0 | 0 |
| Aged 24 Hours at 250° F.: | | | |
| Sample A | 0 | 3 | 7 |
| Sample B | 0 | 0 | 0 |
| Sample C | 0 | 0 | 0 |
| Aged 48 Hours at 250° F.: | | | |
| Sample A | 0 | 0 | 4 |
| Sample B | 0 | 0 | 0 |
| Sample C | 0 | 0 | 0 |

[1] Unsaturation=1.8 mmols ICl/g.
[2] Unsaturation=1.5 mmols ICl/g.
[3] Unsaturation=0.7 mmol ICl/g.

It is apparent from these data that a reduction in unsaturation results in improved ozone resistance, but that even at the low level of unsaturation represented by a titration value of 0.7 mmol of ICl/g., the compounded sample begins to fail at about 13 days. A short high-temperature air aging results in an excellent improvement in ozone resistance of the samples with titration values of 0.7 and 1.5 mmols ICl/g., but somewhat longer aging is required to improve the ozone resistance of the sample having a titration value of 1.8 mmols of ICl/g.

A sample of the parent polymer (titration value of 14.3 mmols ICl/g.) compounded in the same recipe develops severe cracks and breaks in less than 3 days in the ozone resistance test, and is not appreciably improved by heat aging.

EXAMPLE II

Four samples of polymer were prepared according to the following recipe:

POLYMERIZATION RECIPE

|  | Parts by Weight Polymer | | | |
|---|---|---|---|---|
|  | D | E | F | G |
| Cyclohexane | 800 | 800 | 800 | 800 |
| Butadiene | 75 | 75 | 75 | 75 |
| Styrene | 25 | 25 | 25 | 25 |
| Tetrahydrofuran | 0.06 | 0.06 | 0.06 | 0.06 |
| n-Butyllithium | 0.105 | 0.090 | 0.095 | 0.091 |
| Temperature, average, °F | 270 | 272 | 268 | 245 |

These four polymers were hydrogenated as in Example I. These samples were subjected to static and dynamic ozone resistance tests in comparison with a compounded sample of unhydrogenated SBR 1500 rubber, a 75 butadiene-25 styrene emulsion copolymer made according to the 1500 recipe in ASTM D 1419-61T (titration value of 13.7 mmols ICl/g.). Evaluation was made on the same 0 to 10 scale as used in Example I.

| | Cured 30 minutes at 307° F. (320° F. for Sample G) | | | | |
|---|---|---|---|---|---|
| | Sample | | | | |
| | D [1] | E [2] | F [3] | G [4] | SBR [5] |
| Ozone Resistance: | | | | | |
| Dynamic [6] | 6 | 8 | 3 | 1 | 9 |
| Static [7] | 5,566 | 8,886 | 3,422 | 1,231 | Broke [8] |
| Aged 4 hours at 250° F.: | | | | | |
| Dynamic [6] | 0 | 0 | 0 | 0 | 9 |
| Static [7] | Broke [9] | Broke [9] | 0,000 | 0,000 | Broke [8] |

[1] Unsaturation=1.3 mmols ICl/g.
[2] Unsaturation=1.2 mmols ICl/g.
[3] Unsaturation=1.1 mmols ICl/g.
[4] Unsaturation=0.7 mmol ICl/g.
[5] Sulfur level increased to 1.75 parts by weight per 100 parts of polymer (phr.); Captax and Monex replaced by 1.2 phr. of Santocure (N-cyclohexyl-2-benzothiazolesulfenamide), 1 phr. of Flexamine (physical mixture of 65 percent complex diarylaminoketone reaction product and 35 percent N,N'-diphenyl-p-phenylenediamine), and 1 phr. of NBC (an antiozonant containing nickel dibutyldithiocarbamate as active ingredient). This recipe modification was made to optimize the properties of the SBR vulcanizate.
[6] A 12-day test in which the sample was stretched about 15 percent and relaxed about 30 times per minute.
[7] A 7-day test using a wedge ½ inch wide by 4 inches high by 1 inch wide by about 0.080 inch thick.
[8] Severe ozone cracking.
[9] Little ozone cracking.

It is again apparent from the data that high-temperature air aging of the compounded, hydrogenated polymer samples results in considerable improvement in ozone resistance. Even with an antiozonant present, the vulcanized SBR compound had very poor ozone resistance, and the heat aging did not improve the ozone resistance.

Reasonable variation and modification are permissible within the scope of this disclosure and the appended claims without departing from the spirit of our invention.

We claim:
1. Process for improving the ozone resistance of a compounded hydrogenated rubbery polymer of butadiene-styrene random copolymer, butadiene-styrene block copolymer, polybutadiene, polyisoprene, or natural rubber comprising aging said polymers in an oxygen-containing atmosphere at a temperature of 200 to 350° F. wherein said aging occurs in a period of from about 1 hour to about 10 days and wherein said hydrogenated polymer has an iodine chloride titration value of 0.1 to 2 millimols per gram of polymer prior to said aging.

2. Process of claim 1 wherein said polymer is butadiene-styrene random copolymer containing about 75 weight percent butadiene and about 25 weight percent styrene.

3. Process of claim 1 wherein said polymer is hydrogenated over a nickel catalyst to an iodine chloride titration value of 0.1 to 2 millimols per gram of polymer.

References Cited

UNITED STATES PATENTS 2,864,809  12/1958  Jones et al. _____ 260—85.1
3,285,902  11/1966  Schmeidl _____ 260—96 XR

FOREIGN PATENTS 863,256  3/1961  Great Britain.

JOSEPH L. SCHOFER, Primary Examiner
W. F. HAMROCK, Assistant Examiner

U.S. Cl. X.R.
260—94.7, 96, 773